United States Patent
Wandres (10) Patent No.: US 11,626,722 B2
(45) Date of Patent: Apr. 11, 2023

(54) ON-BOARD POWER SUPPLY SYSTEM FOR A VEHICLE

(71) Applicant: Eberspächer Controls Landau GmbH & Co. KG, Landau (DE)

(72) Inventor: Steffen Wandres, Kandel (DE)

(73) Assignee: Eberspächer Controls Landau GmbH & Co. KG, Landau (DE)

( * ) Notice: Subject to any disclaimer, the term of this patent is extended or adjusted under 35 U.S.C. 154(b) by 30 days.

(21) Appl. No.: 17/346,443

(22) Filed: Jun. 14, 2021

(65) Prior Publication Data

US 2021/0391708 A1 Dec. 16, 2021

(30) Foreign Application Priority Data

Jun. 15, 2020 (DE) ...................... 10 2020 115 692.8

(51) Int. Cl.
*H02H 7/12* (2006.01)
*B60L 3/04* (2006.01)
(Continued)

(52) U.S. Cl.
CPC ................ *H02H 7/12* (2013.01); *B60L 3/04* (2013.01); *B60R 16/03* (2013.01); *H02J 1/08* (2013.01); *H02J 7/0013* (2013.01)

(58) Field of Classification Search
CPC ... H02H 7/12; B60L 3/04; B60L 11/18; B60L 33/1811; B60L 11/12; B60L 11/02; B60L 11/1809

(Continued)

(56) References Cited

U.S. PATENT DOCUMENTS

| 9,731,610 B2 * | 8/2017 | Reichow ................. B60L 58/20 |
| 10,654,430 B2 * | 5/2020 | Kontani ................. H02J 7/1423 |
| 2015/0115707 A1 | 4/2015 | Reichow et al. |

FOREIGN PATENT DOCUMENTS

| DE | 102019206502 A1 | 11/2019 |
| EP | 2272722 A2 | 1/2011 |

(Continued)

*Primary Examiner* — Danny Nguyen
(74) *Attorney, Agent, or Firm* — McGlew and Tuttle, P.C.

(57) ABSTRACT

A power supply for a vehicle with a first network (12) with a voltage source (18) and with a first group (G1) of electrical consumers (20), a second network (14) with a second voltage source (22) and with a second group (G2) of electrical consumers (24), and a circuit breaker device (30) connected between the first network(12) and the second network(14) with a first circuit breaker (32) and with a second circuit breaker (34). Each circuit breaker (32, 34) allows in a conductor state, the flow of current between its input terminal (E1, E2) and its output terminal (A1, A2) in both directions, and it allows a flow of current only from the input terminal (E1, E2) to the output terminal (A1, A2) in a diode state. The output terminal (A1) of the first circuit breaker (32) is connected to the first network (12), the input terminal (E1) of the first circuit breaker (32) is connected to the input terminal (E2) of the second circuit breaker (34), and the output terminal (A2) of the second circuit breaker (34) is connected to the second network (16). There is a third network (16) with a third voltage source (26) and with a third group (G3) of electrical consumers (28). The input terminal (E1) of the first circuit breaker (32) and the input terminal (E2) of the second circuit breaker (34) are connected to the third network (16).

20 Claims, 2 Drawing Sheets

(51) Int. Cl.
 *B60R 16/03* (2006.01)
 *H02J 1/08* (2006.01)
 *H02J 7/00* (2006.01)

(58) Field of Classification Search
 USPC .................. 361/23, 93.7–93.9; 307/9.1, 10.1
 See application file for complete search history.

(56) References Cited

FOREIGN PATENT DOCUMENTS

WO  2004103771 A2  12/2004
WO  2013131783 A1  9/2013

* cited by examiner

ON-BOARD POWER SUPPLY SYSTEM FOR A VEHICLE

CROSS REFERENCE TO RELATED APPLICATIONS

This application claims the benefit of priority under 35 U.S.C. § 119 of German Application 10 2020 115 692.8, filed Jun. 15, 2020, the entire contents of which are incorporated herein by reference.

TECHNICAL FIELD

The present invention pertains to an on-board power supply system for a vehicle.

TECHNICAL BACKGROUND

It is required in vehicles that are configured for a highly automated or autonomous driving that the different consumers to be supplied with electrical energy, which are provided in such a vehicle, be supplied with electrical energy in a reliable manner. This applies especially to electrical energy consumers classified as safety-relevant system areas, for example, steering and brake systems. Less safety-relevant system areas to be supplied with electrical energy, for example, the interior lighting of a vehicle, the seat heater or the steering wheel heater, shall also be able to be supplied reliably, but an at least short-term failure of these system areas or a short-term uncoupling of these system areas from the energy supply can be accepted, because this cannot lead to a situation in which safety would be potentially jeopardized.

SUMMARY

An object of the present invention is to provide an on-board power supply system for a vehicle, which guarantees a high level of operational reliability and can nevertheless be embodied with an on-board power supply system topology that can be embodied in a simple and cost-effective manner.

This object is accomplished according to the present invention by an on-board power supply system for a vehicle, comprising
 a first network area with a rechargeable first d.c. voltage source and with a first group of electrical energy consumers,
 a second network area with a rechargeable second d.c. voltage source and with a second group of electrical energy consumers,
 a circuit breaker device connected between the first network area and the second network area with a first circuit breaker and with a second circuit breaker, wherein each circuit breaker allows the flow of current between its input terminal and its output terminal in both directions in a conductor state and allows a flow of current only from the input terminal to the output terminal in a diode state, wherein the output terminal of the first circuit breaker is connected to the first network area, the input terminal of the first circuit breaker is connected to the input terminal of the second circuit breaker, and the output terminal of the second circuit breaker is connected to the second network area, and
 a third network area with a third d.c. voltage source and with a third group of electrical energy consumers, wherein the input terminal of the first circuit breaker and the input terminal of the second circuit breaker are connected to the third network area.

An on-board power supply system with such a structure offers the possibility of uncoupling especially the first network area and the second network area from the respective other network area, and of temporarily supplying the electrical energy consumers associated with such an uncoupled network area from the respective d.c. voltage source also associated with a respective uncoupled network area. A defect leading to an excessively high flow of current, for example, a short circuit, cannot thus lead to a voltage drop and to an insufficiently low supply in an uncoupled network area, because a circuit breaker associated with a respective uncoupled network area is in its diode state in the uncoupled state and it therefore prevents a flow of current from the uncoupled network area.

In order also not to prevent a redundant supply of electrical energy of various electrical energy consumers by a d.c. voltage source associated with another network area already when a high load, which cannot, however, necessarily be attributed to a defect, for example, a short circuit, and is not accompanied by a correspondingly high flow of current, is present in one of the network areas coupled with one another, in principle, via the circuit breaker device, it is proposed according to an especially advantageous aspect that the first circuit breaker be configured to switch, when the first circuit breaker has been switched into its conductor state, into its diode state when its back current flowing in the conductor state over the first circuit breaker exceeds a first current threshold, or/and that the second circuit breaker be configured to switch, when the second circuit breaker has been switched into its conductor state, into its diode state when a back current flowing in the conductor state over the second circuit breaker exceeds a second current threshold. It is only when the back current in one of the circuit breakers exceeds the associated current threshold that the circuit breaker passes over into its diode state and therefore ends the flow of current from this network area.

It should be noted in this connection that in the sense of the present invention, a back current is a flow of current in the conductor state of a respective circuit breaker in a direction that corresponds to the non-conducting direction of the circuit breaker in the diode state thereof, i.e., a flow of current in the direction from the output terminal to the input terminal.

In order not to prevent an exchange of energy between the different network areas even at higher loads, it is proposed that the first current threshold or/and the second current threshold be in a range of 5 A to 90 A and preferably at about 50 A to 70 A. Further, the first current threshold may correspond to the second current threshold, so that a symmetrical switching characteristic of the first circuit breaker and of the second circuit breaker and also a symmetrical load characteristic of the d.c. voltage sources associated with these can be achieved.

In order to increase the safety provided by an on-board power supply system configured according to the present invention even more when states that may lead to an overload develop, it is proposed that the first circuit breaker be configured to switch, when the first circuit breaker has been switched into its conductor state, into its diode state when a network voltage in the first network area drops below a first low voltage threshold, or/and that the second circuit breaker be configured to switch, when the second circuit breaker has been switched into its conductor state, into its diode state when a network voltage in the second network area drops below a second low voltage threshold. It is thus guaranteed that when an excessively high flow of current leads to a voltage drop in a network area, such a flow of current is prevented by the transition into the diode state and a sufficient network voltage can thus be guaranteed in his network area. The taking into consideration of such a low voltage threshold thus also increases the safety especially in the case in which an excessively high flow of current does not lead to a switching into the diode state based on a defect in a circuit breaker. Redundant monitoring criteria, which contribute to a very high level of operational reliability, are thus introduced and integrated into the circuit breaker with the monitoring of the flow of current over a circuit breaker and of the voltage in the network area associated with this circuit breaker.

For example, the first low voltage threshold or/and the second low voltage threshold may be a network voltage that is below a nominal voltage intended for the first network area and for the second network area in the range of 0.5 V to 2 V and preferably about 1 V. This nominal voltage intended for the network areas coupled with one another, in principle, via the circuit breaker device may correspond, in principle, to the voltage to be provided, in principle, by the d.c. voltage sources, which is, for example, in the range of about 12 V. In order to provide a symmetrical switching characteristic here as well, the first low voltage threshold may correspond to the second low voltage threshold.

The safety against unsuitable flows of current between the different network areas can be increased further by the first circuit breaker being configured to switch, when the first circuit breaker has been switched into its conductor state, into its diode state when a network voltage in the first network area exceeds a first overvoltage threshold, or/and by the second circuit breaker being configured to switch, when the second circuit breaker has been switched into its conductor state, into its diode state when a network voltage in the second network area exceeds a second overvoltage threshold. Such an excessive increase in the voltage in a network area may occur, for example, when an electrical energy consumer briefly acts as a generator rather than as a consumer based on an unfavorable effect on the electrical energy consumer in question.

Provisions may be made, for example, for the first overvoltage threshold or/and for the second overvoltage threshold to be a network voltage above a nominal voltage intended for the first network area and for the second network area in a range of 2 V to 6 V, preferably about 4 V, or/and for the first overvoltage threshold to correspond to the second overvoltage threshold.

A further increase in safety can be achieved especially when defective states occur in the third network area by the circuit breaker device comprising a third circuit breaker, wherein the third circuit breaker allows a flow of current between its input terminal and its output terminal in both directions in a conductor state and it allows a flow of current from the input terminal to the output terminal only in a diode state, wherein the input terminal of the third circuit breaker is connected to the third network area and the output terminal of the third circuit breaker is connected to the input terminal of the first circuit breaker and to the input terminal of the second circuit breaker. The first network area and the second network area can be uncoupled by the third circuit breaker from the third network area, while the connection between the first network area and the second network area continues to be maintained. If, for example, fewer electrical energy consumers are associated with the third network area, while the consumers having a higher safety relevance are associated with the first network area and with the second network area, these safety-relevant consumers can be supplied redundantly from the two d.c. voltage sources of the first network area and of the second network area even in case of a defect in the area of the third network area.

It is advantageous in connection with the third circuit breaker as well if this is configured to switch into its diode state when the third circuit breaker has been switched into its conductor state when a back current flowing over the third circuit breaker in the conductor state exceeds a third current threshold.

The third current threshold may be in the range of 5 A to 90 A and preferably at about 50 A to 70 A.

Since a higher flow of current will, in principle, be present in the third circuit breaker than in the other two circuit breakers in case of supplying the third network area from the two d.c. voltage sources of the first network area and of the second network area, it is advantageous if the third current threshold is higher than the first current threshold or/and the second current threshold.

In order to introduce switching criteria leading to a further increase in safety in connection with the third circuit breaker as well, it is proposed that the third circuit breaker be configured to switch, when the third circuit breaker has been switched into its conductor state, into its diode state when a network voltage in the third network area drops below a third low voltage threshold, or/and that the third circuit breaker be configured to switch, when the third circuit breaker has been switched into its conductor state, into its diode state when a network voltage in the third network area exceeds a third overvoltage threshold.

Provisions may be made to this end, for example, for the third low voltage threshold to be a network voltage below a nominal voltage intended for the third network area in the range of 0.5 V to 2 V and preferably about 1 V, or/and for the third overvoltage threshold to be a network voltage above a nominal voltage intended for the third network area in the range of 2 V to 6 V and preferably about 4 V.

In order to reduce the load of a respective circuit breaker and to minimize the energy consumption when the vehicle is deactivated, i.e., for example, parked, over the service life, it is proposed that at least one and preferably each circuit breaker be in its conductor state when the vehicle is deactivated. While the switching or holding of a respective circuit breaker in its diode state involves a comparatively high energy consumption, the functionalities to be provided in the conductor state in such a circuit breaker, which may be configured, in principle, in the manner of a Q diode, can be achieved at a no-load current lower than 100 A. The holding or leaving of a respective circuit breaker in its conductor state with the vehicle deactivated does consequently have a favorable effect not only on the service life of the circuit breaker but also on the energy consumption in a parked vehicle.

The third d.c. voltage source may comprise, for example, a generator driven preferably by an internal combustion engine. The third d.c. voltage source may comprise in an electrically driven vehicle or in a hybrid vehicle a high-voltage battery generally also called traction battery and a d.c./d.c. converter. Such high-voltage batteries are configured for a sufficient supply of the electrical traction motors of a vehicle to provide a voltage in the range of several 100 V, which can then be reduced in the d.c./d.c. converter to the nominal voltage of, for example, about 12 V, which is to be provided in the third network area and, based on the coupling of all network areas with one another, also in the first network area and in the second network area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
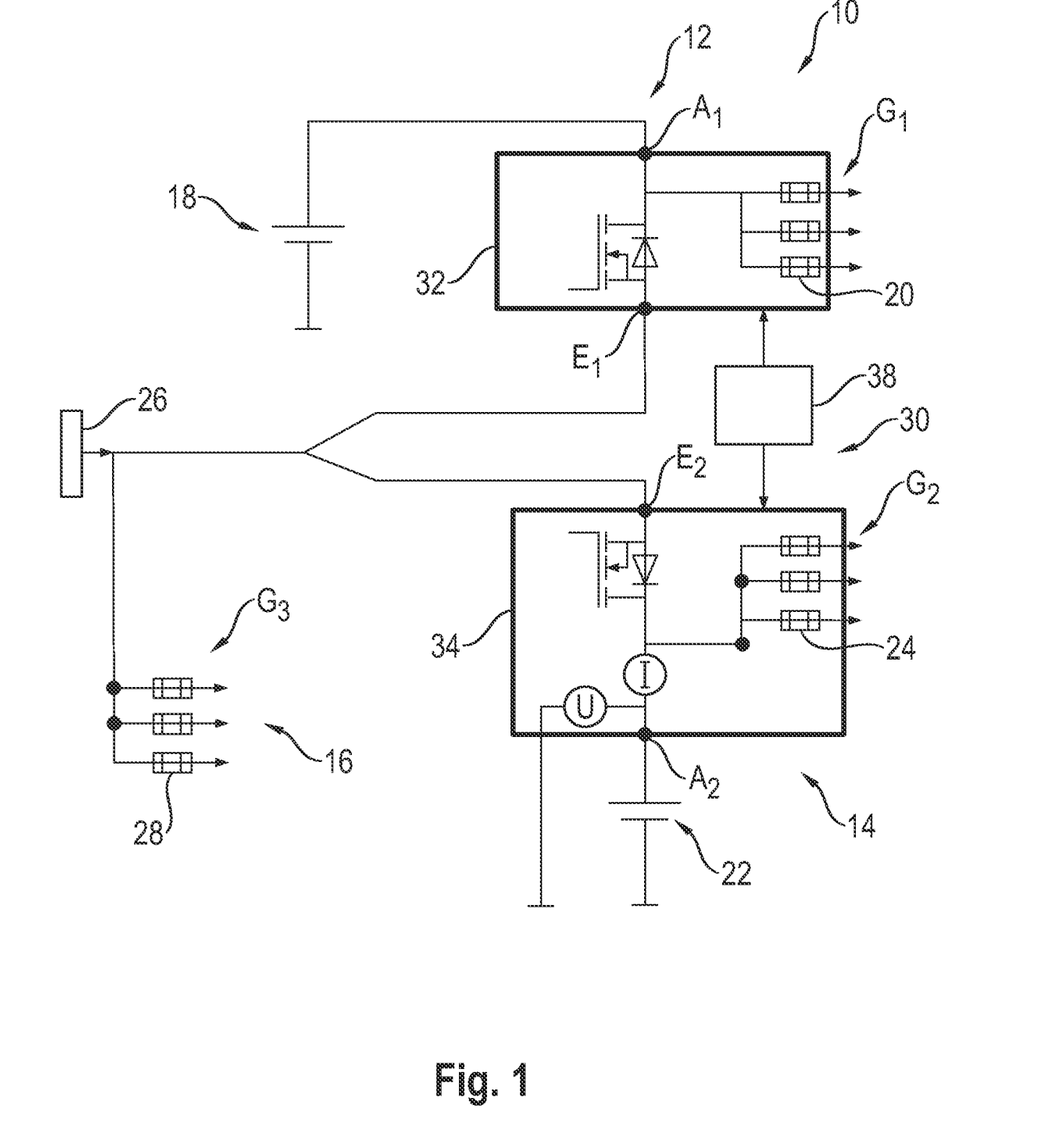
FIG. 1 is a schematic view of an on-board power supply system for a vehicle.

Referring to the drawings, FIG. 1 is a schematic view of a first exemplary embodiment of an on-board power supply system 10. The on-board power supply system 10 may be used especially in vehicles that are configured for a highly automated or autonomous driving.

The on-board power supply system 10 comprises three network areas 12, 14, 16. The first network area 12 comprises a rechargeable first d.c. voltage source 18, for example, a lithium ion battery, and a first group G1 of electrical energy consumers 20. The second network area 14 likewise comprises a rechargeable second d.c. voltage source 22, for example, a lithium ion battery, as well as a second group G2 of electrical energy consumers 24. The two d.c. voltage sources 18, 22 may be configured, for example, to supply a nominal voltage in the range of 12 V for the first network area 12 and for the second network area 14.

The third network area 16 comprises a third d.c. voltage source 26 as well as a third group G3 of electrical energy consumers 28. The third d.c. voltage source 26 may comprise, for example, a d.c./d.c. converter, which reduces the voltage, which is provided by a traction battery provided in an electric motor-driven vehicle and which is in the range of several 100 V, to the nominal voltage intended for the first network area 12 and for the second network area 14, i.e., for example, to a voltage in the range of 12 V. As an alternative or in addition, the third d.c. voltage source 26 may comprise a generator, which can be driven by a drive unit, e.g., by an internal combustion engine, and whose rectified output voltage will then likewise be in the range of the nominal voltage for the first network area 12 and for the second network area 14.

The electrical energy consumers 20, 24, 28 associated with the network areas 12, 14, 16 are grouped essentially such that safety-relevant consumers are associated with the first network area 12 and with the second network area 14. This applies, for example, to the steering system, which may comprise, for example, two steering motors, one of which may be associated with the first group G1 and the other with the second group G2. Further, a brake system, on the one hand, and an electronic stability control, on the other hand, may be provided as such safety-relevant electrical energy consumers. The brake system may be associated, for example, with the first group G1, while the electronic stability control may be associated with the second group G2. Since an electronic stability control is also intended to stabilize the vehicle by braking action while driving a vehicle in curves, these two systems operate redundantly, so that in case of a failure of one of the systems the other system can assume the functionality for braking a vehicle.

Less safety-relevant consumers, e.g., a seat heater, an interior lighting, a steering wheel heater and the like may be associated with the third group G3 of electrical energy consumers 28. The failure of such, less safety-relevant system areas does not essentially compromise the functionality of a vehicle and makes, in particular, possible the continued operation thereof, at least in order to drive the vehicle to a repair shop.

The on-board power supply system 10 comprises, furthermore, a circuit breaker device generally designated by 30. The circuit breaker device 30 comprises, in association with the first network area 12, a first circuit breaker 32, and it comprises, in association with the second network area 14, a second circuit breaker 34. The two circuit breakers 32, 34, configured internally as electronic circuits, which may be configured and operate, in principle, in the manner of a so-called Q diode (quasi diode), have each a first input terminal E1 and a second input terminal E2 as well as a first output terminal A1 as well as a second output terminal A2. In a conductor state, the circuit breakers 32, 34 have a low ohmic resistance and conduct the electrical current in both directions, i.e., from the respective input terminal E1, E2 to the respective output terminal A1, A2 and also in the opposite direction without an appreciable electrical resistance. In a diode state, the circuit breakers 32, 34 block the flow of current from the respective output terminal A1, A2 to the respective input terminal E1, E2, but they are conductive in the flow direction from the input terminal E1, E2 to the respective output terminal A1, A2 and thus they have, in principle, the functionality of a diode.

In each of the two network areas 12, 14, the respective d.c. voltage source 18, 22 is connected with its positive pole to the output terminal A1 and A2, respectively, of the respective associated circuit breaker 32, 34, while the respective negative pole of the d.c. voltage source 18, 22 may be connected to the vehicle ground. Groups G1, G2 of electrical energy consumers 20, 24 are also connected to the output terminal A1 and A2, respectively, so that when the circuit breakers 32, 34 are connected into their respective diode states, the first d.c. voltage source 18 supplies exclusively the consumers 20 of the first group G1 and the second d.c. voltage source 22 supplies exclusively the consumers 24 of the second group G2.

The input terminals E1, E2 are connected to one another and to the third network area 16 and hence also to the consumers 28 of the third group G3. While the consumers 28 of the third group G3 can be supplied exclusively by the third d.c. voltage source 26 in case of circuit breakers 32, 34 switched into their diode state, both the consumers 20 of the first group G1 and the consumers 24 of the second group G2 can be supplied in this state from the third d.c. voltage source 26. Likewise, the first d.c. voltage source 18 and the second d.c. voltage source 22 may be charged by the third d.c. voltage source 26 via the circuit breakers 32 and 34, respectively, independently from the switching state of the circuit breakers 32, 34.

The two circuit breakers 32, 34 are configured, furthermore, such as to switch the circuit breakers 32 and 34, respectively, into their respective diode states when a respective back current, i.e., an electrical current flowing in the non-conducting direction of the respective circuit breaker 32, 34 from the output terminal A1, A2 to the input terminal E1, E2 exceeds an associated first current threshold when the respective circuit breakers 32 and 34 have been switched into the respective conductor state. For a symmetrical switching characteristic, the two circuit breakers 32, 34 preferably have each the same current threshold, which may be in the range of 5 A to 90 A, and preferably at about 50 A to 70 A.

The result of providing such current thresholds is that, upon the occurrence of an excessive back current and the switching operation into the diode mode triggered by this excessive back current, a voltage drop in the network area 12, 14 that is the source of the back current leading to a high load of the associated DC voltage source is prevented. If a defect, for example, a short circuit, which leads to an excessive flow of current occurs, for example, in the area of the third network area 16 or of the second network area 14, the first circuit breaker 32 will switch into its diode state when the electrical current flowing over same exceeds the associated current threshold of, e.g., 50 A if both circuit breakers 32, 34 of the circuit breaker device 30 are at first in their closed state, i.e., in their conductor state. It is thus guaranteed that a voltage drop will not occur in the first network area 12 and the consumers 20 of the first group G1 can be operated reliably. If the defect is in the third network area 16, a correspondingly high flow of current in the non-conductive direction, i.e., a correspondingly high back current, will also develop in the second network area 14. If this back current exceeds the associated current threshold of the second circuit breaker 34, this will also switch into its diode state, i.e., into its open state, so that the second network area 14 will also be protected from a voltage drop, and it is guaranteed that the consumers 24 of the second group G2, which are associated with this second network area 14 can continue to be operated reliably from the second d.c. voltage source 22.

This switching into the diode state, which takes place in case a respective current threshold of the back current over the circuit breakers 32, 34 is exceeded, occurs when, for example, the third d.c. voltage source 26 is no longer able in case of a defect in the third network area 16 to supply the additional current elicited by the defect. As long as this excess flow of current can be supplied by the third d.c. voltage source 26, a back current exceeding the respective current thresholds of the circuit breakers 32, 34 will not occur via these circuit breakers 32, 34. The back current in the first circuit breaker 32 or in the second circuit breaker 34 will exceed the associated current threshold and thus trigger the switching into the diode state only when the third d.c. voltage source 26 is no longer able, for example, based on a short circuit in one of the consumers 28, to supply current for this consumer.

A low voltage threshold and an overvoltage threshold may be provided as additional safety measures for the circuit breakers 32, 34. The low voltage threshold may be, for example, in the range of 0.5 V to 2 V below the nominal voltage intended for the first network area 12 and for the second network area 14, i.e., for example, below a voltage of about 12 V. If the voltage relative to the ground potential drops below this low voltage threshold in the respective network area 12 and 14, a respective circuit breaker 32 and 34 switches into its diode state if the conductor state was set before, in order to prevent a further voltage drop. The configuration is selected, in general, also considering the performance capacity of the d.c. voltage sources 18, 22, such that the current threshold is at first exceeded in case of correct functionality, which means that the low voltage threshold will not become noticeable per se at first in case of correct functionality. The low voltage threshold will then become noticeable in case of a defect in the area of the respective circuit breaker 32, 34, which does not make it possible to correctly detect the back current or to take it into consideration.

An overvoltage threshold intended for the respective circuit breakers 32, 34 may be in the range of 2 V to 6 V, for example, about 4 V, above the nominal voltage of, e.g., about 12 V, which is preset for the network areas 12 and 14, respectively. This means that even when this overvoltage threshold is exceeded, a respective circuit breaker 32, 34 held in the conductor state before passes over into its diode state. Such a state with an overvoltage appearing in a network area 12 or 14 may be triggered, for example, by an external effect on one of the consumers 20 and 24. For example, the fact that a wheel being steered by a steering motor of a steering system touches a curb or another obstacle leads to an external force action and hence to a movement of the wheel, which in turn has the consequence that a steering motor or each steering motor of the steering system will act briefly as a generator and generates a very high voltage. In order to prevent the electrical energy consumers 20 and 24 of the respective other network area 12 and 14 from being compromised, the circuit breaker 32 or 34 of the respective network area 12, 14, in which such a state develops, can be switched into its diode state.

Figure 2:
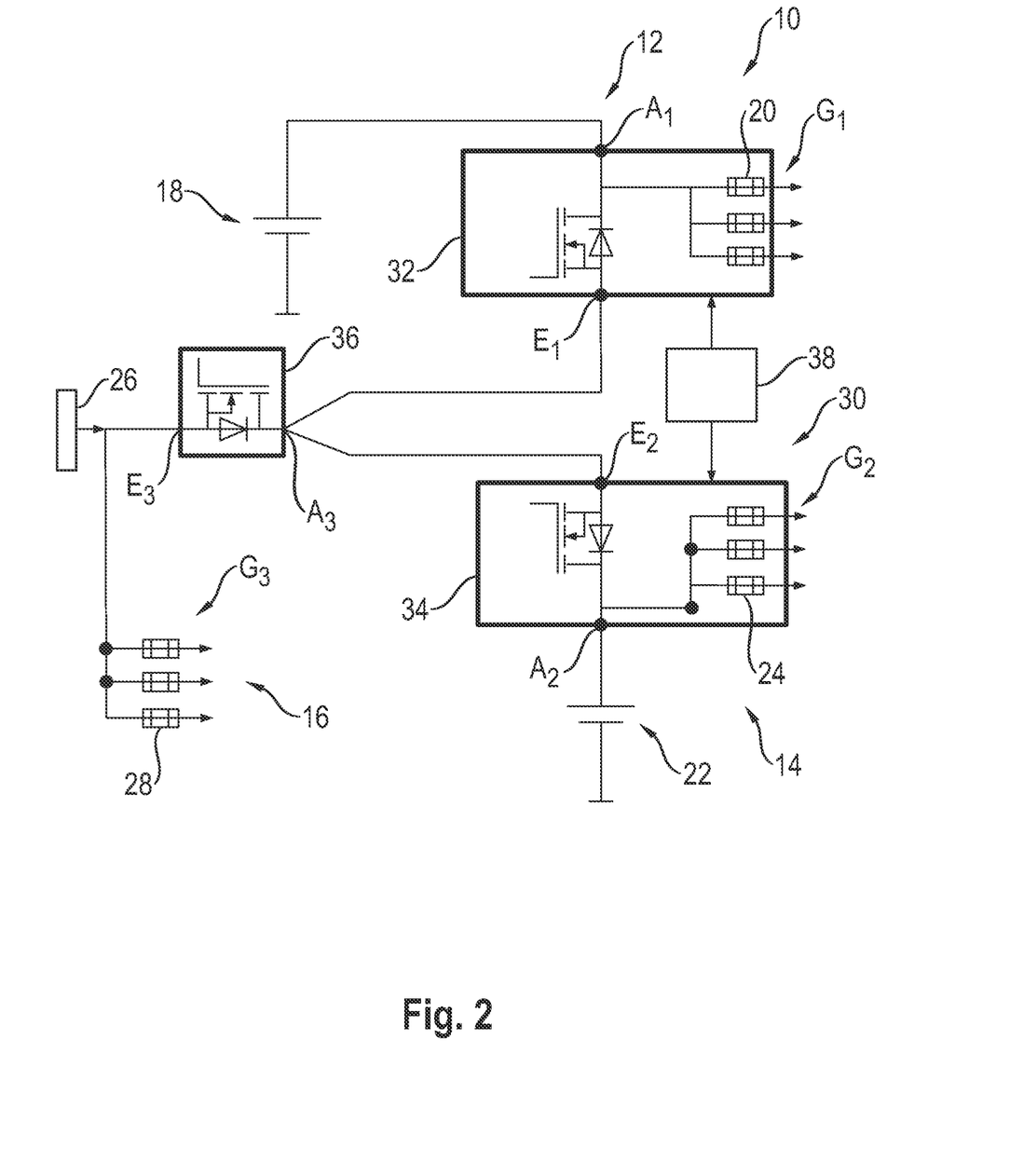
FIG. 2 is a view of an alternative embodiment of an on-board power supply system for a vehicle in a view corresponding to FIG. 1.

An alternative embodiment of an on-board power supply system 10 is shown in FIG. 2. The circuit breaker device 30 additionally comprises in this embodiment a third circuit breaker 36, which may correspond in terms of its configuration and its functionality to the first circuit breaker 32 or to the second circuit breaker 34. Since the third d.c. voltage source 26 and the third group G3 of electrical energy consumers 36 are connected to the third input terminal E3 of the third circuit breaker 36, the third network area 16 with its third d.c. voltage source 26 and with the consumers 28 of the third group G3 can be uncoupled from the first network area 12 and from the second network area 14, so that a flow of current from the first network area 12 or from the second network area 14 to the third network area 16 cannot occur in the diode state of the third circuit breaker 36 regardless of the switching state of the first circuit breaker 32 and of the second circuit breaker 34. However, based on the conductivity in the diode state regardless of the switching state of the circuit breakers 32, 34, 36, each of the two d.c. voltage sources 18, 22 can nevertheless be charged by the third d.c. voltage source 26. Each consumer 20, 24 of the groups G1, G2 may also be supplied with electrical energy by the third d.c. voltage source 26 regardless of the switching state of the circuit breakers 32, 34, 36.

The provision of the third circuit breaker 36 makes it possible to hold the two circuit breakers 32, 34 in their conductor state when a defect leading to an excessively high flow of current develops in the area of the consumers 28 or in the third network area 16, and thus to continue to couple the first network area 12 and the second network area 14 with one another in order to be able to continue to supply the consumers 20 of the first group G1 and the consumers 24 of the second group G2 redundantly from the two d.c. voltage sources 18, 22 and thus to achieve a very high level of safety. This is especially advantageous because the consumers 20, 24 provided in the first network area 12 and in the second network area 14 and, in principle, the electrical components associated with these network areas 12, 24 are configured for a higher level of safety and are thus also substantially more expensive than the less safety-relevant consumers 28 of the third group G3. The probability that a defect leading to an excessive flow of current or to a voltage drop will occur in the third network area 16 is thus markedly higher than that such a defect occurs in the first network area 12 or in the second network area 14.

A current threshold and a low voltage threshold and an overvoltage threshold are likewise associated with the third circuit breaker 36. Since such a flow of current will occur from both the first network area 12 and the second network area 14 when the circuit breakers 32, 34, 36 are held at first in their respective conductor states, these back currents add up over the first circuit breaker 32 and the second circuit breaker 34 at the third output terminal A3 of the third circuit breaker 36. It is therefore advantageous to define for the third circuit breaker 36 a current threshold that is higher than the current threshold of the first circuit breaker 32 and of the second circuit breaker 34. If, for example, a current threshold for the respective back current is set in the range of 50 A for the first circuit breaker 30 and for the second circuit breaker 34, a current threshold in the range of 70 A can be set for the third circuit breaker 36. The low voltage threshold and overvoltage threshold preset in association with the third circuit breaker 36 may also have a greater distance from the nominal voltage of, e.g., 12 V than the low voltage threshold and overvoltage threshold associated with the first circuit breaker 32 and with the second circuit breaker 34.

The circuit breakers 32, 34 and optionally also 36 of the circuit breaker device 30 are advantageously in connection in the above-described on-board power supply systems 10 with an actuating system 38, via which information on the current operating state of a vehicle is also communicated to the circuit breakers 32, 34, 36. It thus becomes possible to also bring the circuit breakers 32, 34, 36 into defined switching states depending on the operating state of a vehicle. Provisions may be made, for example, for the circuit breakers 32, 34 and optionally 36 to be switched into their conductor state or to hold them in this state when a vehicle is deactivated, i.e., for example, when it is parked. No-load currents lower than 100 µA flow in such circuit breakers in the conductor state, which leads to a very low load of the d.c. voltage sources 18 and 22, respectively. When switching into the respective diode state or when holding the circuit breakers 32, 34, 36 in the diode state, the energy consumption of these circuit breakers is markedly higher, which would lead to a more rapid discharge of the d.c. voltage sources 18, 22.

The circuit breakers 32, 34 and optionally 36 are, in principle, in their respective conductor state during normal driving, i.e., during driving by a driver. If, as was described above, a defect leading to an excessively high back current or to a voltage drop develops or if an external effect triggers a voltage peak in a network area, a circuit breaker associated with this network area or with another network area switches into its diode state in order to protect the network area against, for example, a voltage drop. This is especially advantageous because when, for example, the second network area 14 is damaged, for example, in case of an accident, such that a short circuit develops there, the still functional circuit breaker 32 of the first network area 12 will uncouple the first network area 12 and thus make possible a reliable operation of the safety-relevant consumers 20 associated with this first network area 12 even if the second circuit breaker 34 associated with the second network area is also unable to be actuated correctly any longer. It is especially advantageous for this reason to arrange the network areas with safety-relevant consumers, i.e., the first network area 12 and the second network area 14, in a vehicle separated from one another in space such that the risk of damage to both network areas 12, 14 in an accident will be comparatively low. For example, one of the network areas, i.e., essentially the respective d.c. voltage source and the associated circuit breaker, may be accommodated in the front area of a vehicle, while the d.c. voltage source and the circuit breaker of the other safety-relevant network area may be accommodated in the rear area of the vehicle.

The circuit breakers 32, 34 and optionally 36 of the circuit breaker device 30 are, in principle, in the conductor state also when a vehicle thus configured is in an autonomous driving mode. If a defect develops in this state of the vehicle in any of the network areas, which leads to an excessively high back current, the breaking explained above, which is to be carried out by switching into the conductor state, can be carried out. Allowing a back current until the associated current threshold is reached makes it likewise possible, even when, for example, the consumers 28 of the third group G3 impose a heavy load on the on-board power supply system 10, for example, because many or all consumers of the third group G3 are being operated simultaneously, to be able to also supply these from the d.c. voltage sources 18, 22 via the circuit breakers 32, 34 and optionally 36, which are being held in the conductor state as the current threshold has not yet been reached. This is especially advantageous when the third d.c. voltage source 26 fails as an energy supplier because of a defect.

It should further be pointed out that additional safety devices, for example, fuses, may be associated especially with the first network area 12 and with the second network area 14 in order to secure the safety-relevant consumers 20 and 24 individually against overload. Such fuses may be configured, for example, for a current flow of 20 A. If a defect leading to an excessive flow of current develops in the area of a consumer 20 and 24, the circuit breaker of the respective other network area will pass over first into its diode state in order to uncouple this network area. After triggering such a fuse and after the uncoupling of a consumer leading to an excessive flow of current, which uncoupling was brought about thereby, the circuit breaker, which was switched into its diode state before, will close again, i.e., it will switch back into its conductor state.

It should further be pointed out that the circuit breakers configured, in general, with one or more semiconductor elements, e.g., MOSFET circuit components, can be subjected to a diagnosis at regular intervals or continually by means of, for example, a microprocessor integrated into them in order to ascertain, for example, by carrying out switching tests, whether they are able to function correctly and can pass immediately over into the necessary switching state when needed. For example, the currents of respective charging pumps, the gate drivers and gate voltages may be monitored and analyzed for this purpose. Such a diagnosis may, of course, also be carried out starting from the actuating system. The functionalities and circuitries for detecting the flow of current over a respective circuit breaker as well as the network voltage present in the respective associated network area and for a comparison with respective associated threshold values are advantageously also integrated into the respective circuit breakers, as is illustrated in FIG. 1 on the basis of the circuit breaker 34.

While specific embodiments of the invention have been shown and described in detail to illustrate the application of the principles of the invention, it will be understood that the invention may be embodied otherwise without departing from such principles.

What is claimed is:

1. An on-board power supply system for a vehicle, the system comprising:

a first network area with a rechargeable first d.c. voltage source and with a first group of electrical energy consumers;

a second network area with a rechargeable second d.c. voltage source and with a second group of electrical energy consumers;

a circuit breaker device connected between the first network area and the second network area with a first circuit breaker and with a second circuit breaker, wherein each of the first and second circuit breakers has an input terminal and an output terminal, each of the first and second circuit breakers has a conductor state and a diode state, each of the first and second circuit breakers allows a flow of current between a respective input terminal and a respective output terminal in both directions in the conductor state, each of the first and second circuit breakers allows a flow of current in a diode state only from the respective input terminal to the respective terminal, the output terminal of the first circuit breaker being connected to the first network area, the input terminal of the first circuit breaker being connected to the input terminal of the second circuit breaker, and the output terminal of the second circuit breaker being connected to the second network area; and a third network area with a third d.c. voltage source and with a third group of electrical energy consumers, wherein the input terminal of the first circuit breaker and the input terminal of the second circuit breaker are connected to the third network area.

2. The on-board power supply system in accordance with claim 1, wherein one of:

the first circuit breaker is configured to switch from the conductor state into the diode state when a back current flowing through the first circuit breaker exceeds a first current threshold; and the second circuit breaker is configured to switch from the conductor state into the diode state when a back current flowing through the second circuit breaker exceeds a second current threshold.

3. The on-board power supply system in accordance with claim 2, wherein one of:

one of the first current threshold and the second current threshold is in a range of 5 A to 90 A; and the first current threshold corresponds to the second current threshold.

4. The on-board power supply system in accordance with claim 1, wherein one of:

the first circuit breaker is configured to switch from the conductor state into the diode state when a network voltage in the first network area drops below a first low voltage threshold; and the second circuit breaker is configured to switch from the conductor state into its diode state when a network voltage in the second network area drops below a second low voltage threshold.

5. The on-board power supply system in accordance with claim 4, wherein one of:

one of the first low voltage threshold and the second low voltage threshold is a voltage that is below a nominal voltage provided for the first network area and for the second network area in the range of 0.5 V to 2 V; and the first low voltage threshold corresponds to the second low voltage threshold.

6. The on-board power supply system in accordance with claim 1, wherein one of:

the first circuit breaker is configured to switch from the conductor state into the diode state when a network voltage in the first network area exceeds a first overvoltage threshold; and the second circuit breaker is configured to switch from the conductor state into the diode state when a network voltage in the second network area exceeds a second overvoltage threshold.

7. The on-board power supply system in accordance with claim 6, wherein one of:

one of the first overvoltage threshold and the second overvoltage threshold is a network voltage above a nominal voltage provided for the first network area and for the second network area in the range of 2 V to 6 V; and the first overvoltage threshold corresponds to the second overvoltage threshold.

8. The on-board power supply system in accordance with claim 1, wherein:

the circuit breaker device comprises a third circuit breaker with an input terminal and an output terminal, the third circuit breaker circuit has a conductor state and a diode state, the third circuit breaker circuit allows a flow of current between a respective input terminal and output terminal in both directions in the conductor state, the third circuit breaker circuit allows a flow of current only from the respective input terminal to the respective output terminal in the diode state, the input terminal of the third circuit breaker being connected to the third network area and the output terminal of the third circuit breaker being connected to the input terminal of the first circuit breaker, and to the input terminal of the second circuit breaker.

9. The on-board power supply system in accordance with claim 8, wherein:

the third circuit breaker is configured to switch from the conductor state into the diode state when a back current flowing in the conductor state through the third circuit breaker exceeds a third current threshold.

10. The on-board power supply system in accordance with claim 9, wherein:

the third current threshold is in a range of 5 A to 90 A and preferably at about 50 A to 70 A.

11. The on-board power supply system in accordance with claim 8, wherein:

one of the third current threshold is higher than the first current threshold and the second current threshold.

12. The on-board power supply system in accordance with claim 8, wherein one of:

the third circuit breaker is configured to switch from the conductor state into the diode state when a network voltage in the third network area drops below a third low voltage threshold; and the third circuit breaker is configured to switch from the conductor state into the diode state when a network voltage in the third network area exceeds a third overvoltage threshold.

13. The on-board power supply system in accordance with claim 12, wherein one of:

the third low voltage threshold is a network voltage below a nominal voltage intended for the third network area in the range of 0.5 V to 2 V; and the third overvoltage threshold is a network voltage above a nominal voltage intended for the third network area in the range of 2 V to 6 V.

14. The on-board power supply system in accordance with claim 1, wherein:

one of the circuit breakers is in the conductor state when the vehicle has been deactivated.

15. The on-board power supply system in accordance with claim 1, wherein:
the third d.c. voltage source comprises one of a generator driven by an internal combustion engine, a high-voltage battery and a d.c./d.c. converter.

16. The on-board power supply system in accordance with claim 2, wherein one of:
one of the first current threshold and the second current threshold is in a range of 50 A to 70 A.

17. The on-board power supply system in accordance with claim 4, wherein:
one of the first low voltage threshold and the second low voltage threshold is a voltage that is below a nominal voltage provided for the first network area and for the second network area by 1 V.

18. The on-board power supply system in accordance with claim 6, wherein:
one of the first overvoltage threshold and the second overvoltage threshold is a network voltage above a nominal voltage provided for the first network area and for the second network area by 4 V.

19. The on-board power supply system in accordance with claim 9, wherein:
the third current threshold is in a range of 50 A to 70 A.

20. An on-board power supply system for a vehicle, the system comprising:
a first voltage source;
a first network with a first group of electrical consumers, said first network being connected to said first voltage source;
a first circuit breaker having an input terminal and an output terminal, said output terminal being connected to said first network, said first circuit breaker having a conductor state and a diode state, said conductor state allowing current to flow between said input terminal and said output terminal in both directions, said diode state allowing current flow from said input terminal to said output terminal, said diode state blocking current flow from said output terminal to said input terminal;
a second voltage source;
a second network with a second group of electrical consumers, said second network being connected to said second voltage source;
a second circuit breaker having an input terminal and an output terminal, said output terminal being connected to said second network, said second circuit breaker having a conductor state and a diode state, said conductor state of said second circuit breaker allowing current to flow between said input terminal and said output terminal of said second circuit breaker in both directions, said diode state of said second circuit breaker allowing current flow from said input terminal to said output terminal of said second circuit breaker, said diode state of said second circuit breaker blocking current flow from said output terminal to said input terminal of said second circuit breaker;
a third voltage source; and
a third network with a third group of electrical consumers, said third network being connected to said third voltage source, said input terminal of said first and second circuit breakers being connected to said third voltage source.

* * * * *